United States Patent
Tang et al.

(10) Patent No.: US 11,301,301 B2
(45) Date of Patent: Apr. 12, 2022

(54) WORKLOAD OFFLOADING BETWEEN COMPUTING ENVIRONMENTS

(71) Applicant: International Business Machines Corporation, Armonk, NY (US)

(72) Inventors: Gang Tang, Nanjing (CN); Yue Wang, Beijing (CN); Liang Rong, Suzhou (CN); Wen Tao Zhang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 58 days.

(21) Appl. No.: 16/935,255

(22) Filed: Jul. 22, 2020

(65) Prior Publication Data

US 2022/0027197 A1 Jan. 27, 2022

(51) Int. Cl.
*G06F 9/50* (2006.01)

(52) U.S. Cl.
CPC ............ *G06F 9/505* (2013.01); *G06F 9/5038* (2013.01); *G06F 9/5083* (2013.01); *G06F 2209/5022* (2013.01)

(58) Field of Classification Search
CPC ...... G06F 9/505; G06F 9/5038; G06F 9/5083; G06F 2209/5022
See application file for complete search history.

(56) References Cited

U.S. PATENT DOCUMENTS 10,397,240 B2  8/2019  Lewis
10,432,552 B2  10/2019  Zhang
2012/0222041 A1* 8/2012 Sabin .............. G06F 9/5083
  718/105
2019/0340033 A1  11/2019  Ganteaume
2021/0232440 A1* 7/2021 Ranjan .............. G06F 9/5083

FOREIGN PATENT DOCUMENTS

EP  3561671 A1  10/2019

OTHER PUBLICATIONS

"Virtual nodes—User Guide for Kubernetes Clusters Alibaba Cloud Document Center", Alibaba Cloud, Last Updated: May 9, 2020, 6 pages, <https://partners-intl.aliyun.com/help/doc-detail/118970.htm>.

Mell et al., "The NIST Definition of Cloud Computing", National Institute of Standards and Technology U.S Department of Commerce, Special Publication 800-145, Sep. 2011, 7 pages.

* cited by examiner

*Primary Examiner* — Sisley N Kim
(74) *Attorney, Agent, or Firm* — David B. Woycechowsky

(57) ABSTRACT

Embodiments of the present disclosure relate to a method, system and computer program product for offloading a workload between computing environments. According to the method, a workload of a target function of a service provisioned in a first computing environment is determined. A processing capacity of the service available for the target function in the first computing environment is determined. In accordance with a determination that the workload exceeds the processing capacity, at least one incoming request for the target function is caused to be routed to a target instance of the target function, the target instance of the target function being provisioned in a second computing environment different from the first computing environment.

18 Claims, 10 Drawing Sheets

WORKLOAD OFFLOADING BETWEEN COMPUTING ENVIRONMENTS

BACKGROUND

The present disclosure generally relates to computer techniques and more particularly, to a method, system, and computer program product for offloading a workload between computing environments.

Cloud computing is one of the fastest growing trends in computer technology which involves the delivery of hosted services over a network. Cloud computing environments provide for the delivery of computing and storage resources as a service to end users. End users can issue requests to the provisioned services for processing. The processing capacities of the services are generally limited by the configured resources. Despite all of the auto-scaling capability provided in the cloud computing environments, the problem of workload bottlenecks for the services still needed to be resolved.

SUMMARY

According to one embodiment of the present disclosure, there is provided a computer-implemented method. According to the method, a workload of a target function of a service provisioned in a first computing environment is determined. A processing capacity of the service available for the target function in the first computing environment is determined. In accordance with a determination that the workload exceeds the processing capacity, at least one incoming request for the target function is caused to be routed to a target instance of the target function, the target instance of the target function being provisioned in a second computing environment different from the first computing environment.

According to a further embodiment of the present disclosure, a system is provided. The system comprises a processing unit and a memory coupled to the processing unit and storing instructions thereon. The instructions, when executed by the processing unit, perform acts of any one of the above methods according to embodiment of the present disclosure.

According to a yet further embodiment of the present disclosure, there is provided a computer program product being tangibly stored on a non-transient machine-readable medium and comprising machine-executable instructions. The instructions, when executed on a device, cause the device to perform any one of the above methods according to embodiment of the present disclosure.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
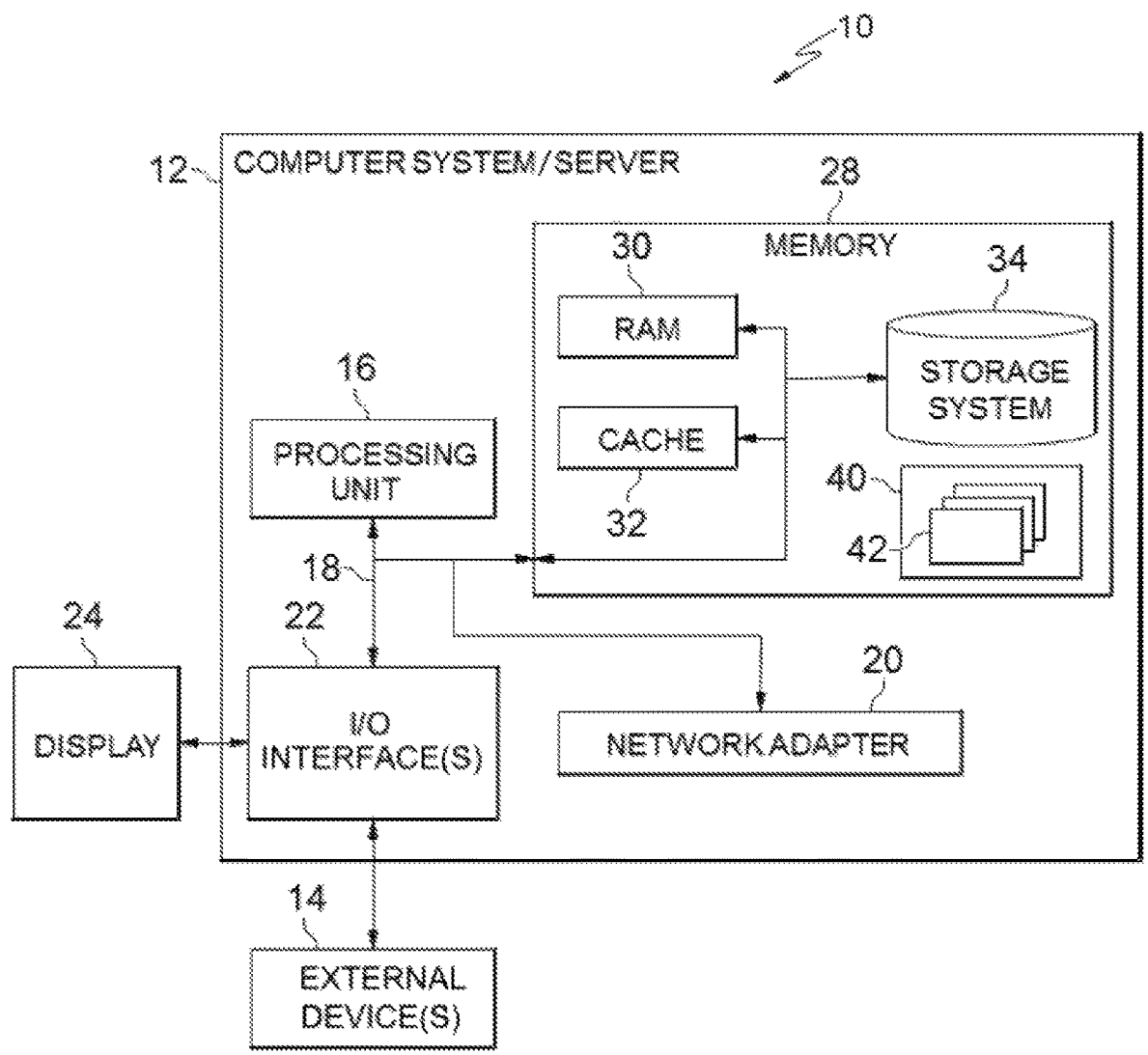
FIG. 1 depicts a cloud computing node in accordance with some embodiments of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the services' provider.

Broad network access: capabilities are available over a network and accessed through standard mechanisms that promote use by heterogeneous thin or thick client platforms (for example, mobile phones, laptops, and PDAs (personal digital assistant)).

Resource pooling: the providers computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the providers applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs (personal computer), minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for example, a "floppy disk"), and an optical disk drive for reading from or writing to a removable, non-volatile optical disk such as a CD-ROM (compact disc read-only memory), DVD-ROM (digital versatile disk read-only memory) or other optical media can be provided. In such instances, each can be connected to bus 18 by one or more data media interfaces. As will be further depicted and described below, memory 28 may include at least one program product having a set (for example, at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (for example, network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (for example, the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of independent disks) systems, tape drives, and data archival storage systems, etc.

Figure 2:
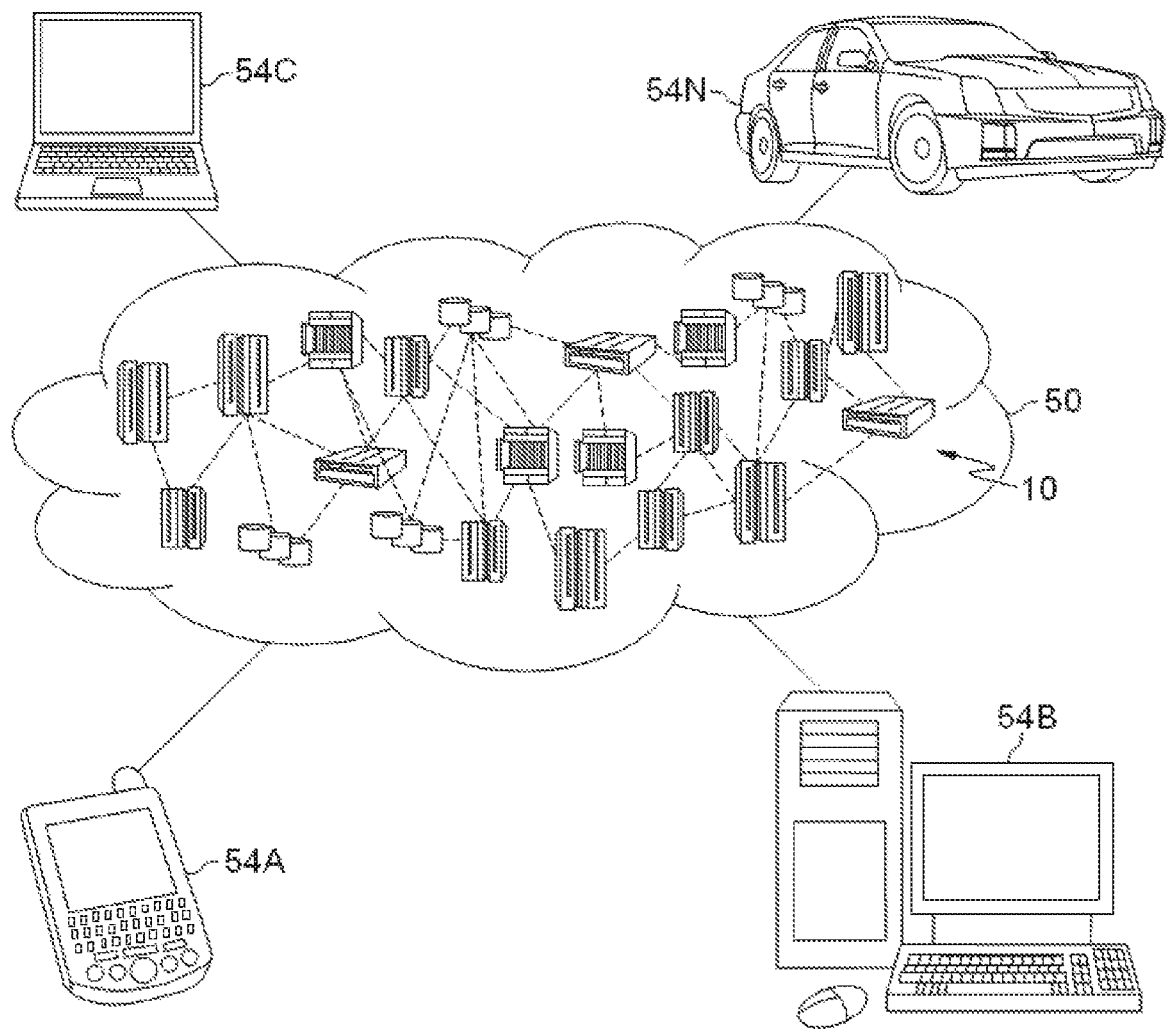
FIG. 2 depicts a cloud computing environment in accordance with some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (for example, using a web browser).

Figure 3:
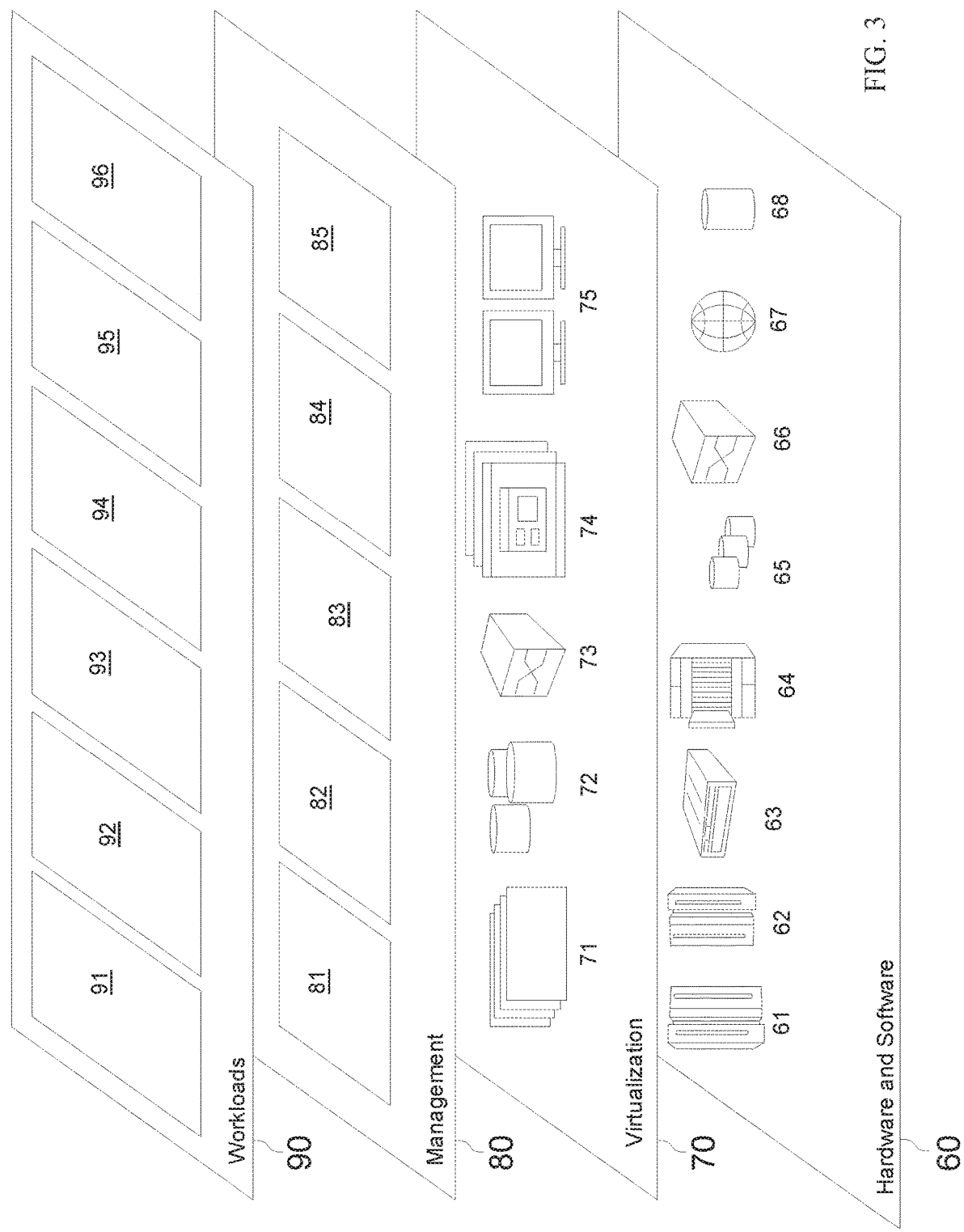
FIG. 3 depicts abstraction model layers in accordance with some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (reduced instruction set computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workload offloading 96. The functionalities of workload offloading 96 will be described in the following embodiment of the present disclosure.

Example Computing Environment

Figure 4:
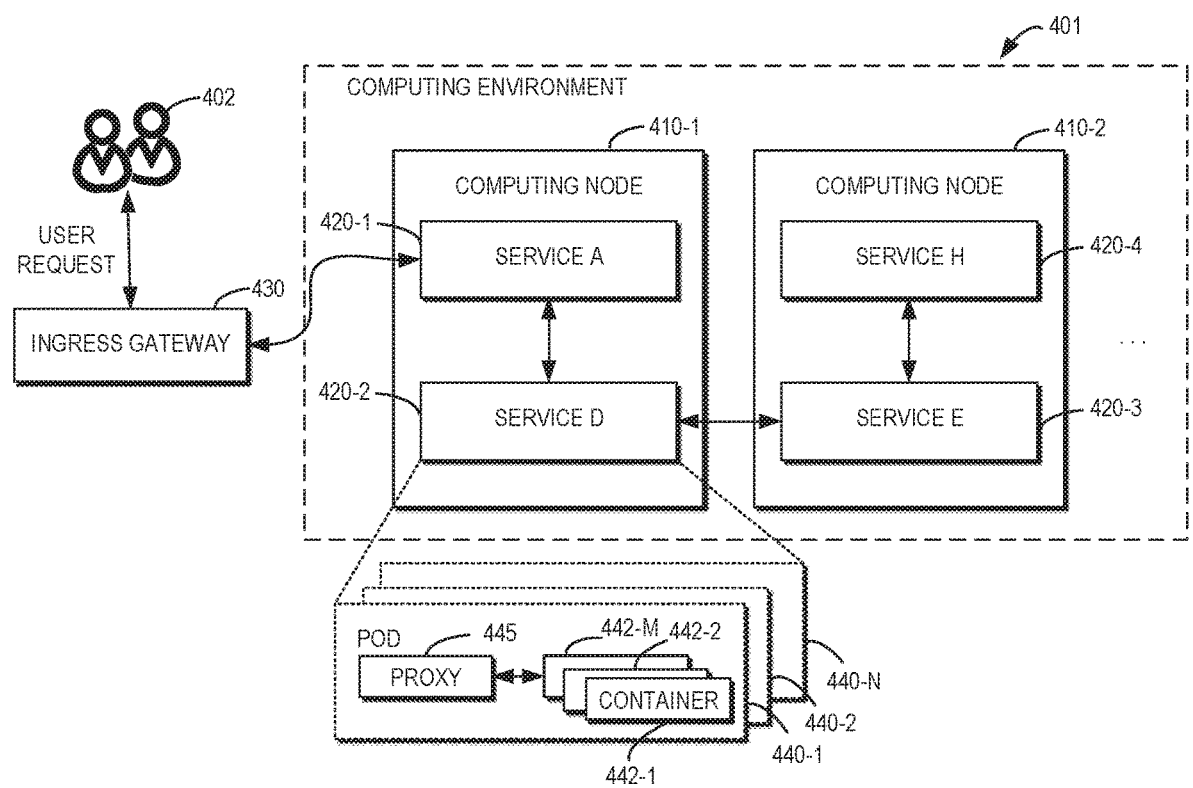
FIG. 4 depicts a block diagram of an example computing environment.

FIG. 4 illustrates an example computing environment or platform 401 on which services can be provisioned.

As shown in FIG. 4, computing environment 401 comprises a plurality of computing nodes (such as servers) 410-1, 410-2 operating on a distributed communication network, with each node including local processing and memory resources. Rather than running an application locally or storing data locally, an end user(s) 402 may run an application(s) or store data remotely in computing environment 401. The application(s) can be provisioned in computing environment 401 as a plurality of services 420-1, 420-2, 420-3, and 420-4, represented as services "A", "D", "E", "H", respectively. For convenience of discussion, computing nodes 410-1, 410-2 are herein collectively or individually referred to as computing nodes 410, and services 420-1, 420-2, 420-3, and 420-4 are herein collectively or individually referred to as services 420.

It would be appreciated that the number of computing nodes, the number of services, and the arrangement of the services across the computing nodes in FIG. 4 are provided for the purpose of illustration only. The computing environment may comprise one or more other computing nodes, and the number of services may be different and arranged in other manners.

End user(s) 402 may provision and access services 420 through a web browser or some other software application on a client. In some embodiments, the provisioning and/or requests of end user(s) 402 may be provided to an ingress gateway 430. Ingress gateway 430 may include a corresponding proxy for processing the provisioning and/or the requests to services 420.

Services 420 are provisioned or deployed according to various virtualization technologies supported by computing environment 401. In some embodiments, services 420 may be provisioned according to virtual machine (VM)-based virtualization, container-based virtualization, and/or or the like. According to the VM-based virtualization, a VM can be initiated to emulate a real computer that can execute programs and applications without having direct contact with any actual hardware resources. While the VM virtualizes a machine, according to the container-based virtualization, a container can be initiated to virtualize an entire operating system (OS) so that multiple workloads can run on a single OS instance. VM-based virtualization may include, for example, vSphere; and the container-based may include, for example, Kubernetes, Cloud Foundry, and the like.

In an example of the container-based virtualization, a number of containers for a service 420 may be assembled into a pod (for example, a Kubernetes pod). By way of example, as illustrated in FIG. 4, service 420-2 may be provisioned with one or more pods 440-1, 440-2, . . . 440-N (collectively referred to as pod 440), where N is an integer larger than or equal to one. Each pod 440 may include a proxy 445 and one or more containers 442-1, 442-2, . . . , 442-M (collectively referred to as container 442), where M is an integer larger than or equal to one. One or more container(s) 442 in pod 440 handle requests related to one or more corresponding functions of the service and proxy 445 usually control network related functions for the service, such as routing, load balancing, and the like. Other services 420 can also be provisioned with pods similar to pod(s) 440. However, it would be appreciated that the container provisioning based on pods is illustrated as a specific example only, without suggesting any limitation to the scope of the present disclosure. A variety of other virtualization techniques can also be utilized.

As used herein, a "service" can represent an application, multiple applications or a subset of a single application. Generally speaking, the terms "service" and "application" can be used interchangeably. A service consists of one or more functions. In computing environment 401, each function of a service 420 can be separately addressed, for example, via a separate endpoint for an application program interface (API).

During operation, execution of a user request from end user(s) 402 may require invoking of one or more services 420 in computing environment 401, execution of one or more functions of a service 420 may require invoking one or more functions of another service 420. In an example shown in FIG. 4, service "A" 420-1 receives a user request(s) of end user(s) 402 from the ingress gateway 430. Service "A" 420-1 may invoke service "D" 420-2, and service "D" 420-2 may request service "E" 420-3 to perform one or more functions. Further, service "E" 420-3 may further request service "H" 420-4 to perform one or more functions. It would be appreciated that invoking the services in FIG. 4 is provided as an example only. In other examples, service 420 may invokes more than one service 420, and one or more other services, not shown in FIG. 4, may also be invoked in response to a user request.

In some service-based computing environment such as computing environment 401, services are typically provisioned according to a user configuration, with the cost corresponding to the actual amount of resources configured for the services by the end user(s) of the services. In some cases, a service can be auto-scaled in order to handle peak and valley workloads, for example, by deploying more or less instances of the services utilizing more resources. However, it is difficult to timely react to dynamic changes of resource requirements. As a result, a conservative scaling policy can hardly meet the resource requirements of burst workloads, while an aggressive policy may cause instability of the request scheduling system and larger cost.

In some cases, if a fixed number of computing nodes are configured as a cluster to provision services, the scaling of the services may have an upper limit. Although the cluster of computing nodes can be scaled, it may take more time to wait for the scaling of the cluster. As the workloads of the services change over time, the time cost for scaling the cluster of the computing nodes may be longer than the time duration of the peak workloads.

In addition to the service-based computing environment, there is another type of computing environment called as a serverless computing environment or platform, of which functions-as-a-service (FaaS) is one example. The serverless computing environment is a cloud computing model, allowing for the use of short-running, generally stateless, functions that can be triggered by events.

The term "serverless computing" does not indicate that no computer servers are used in the computing environment. Rather, the term indicates that a user of the serverless computing environment does not need to provision or manage the physical computer servers, virtual machines, containers, and the like, that are used by the platform in executing the user's instructions.

In a serverless computing environment, allocation of resources is managed by the cloud service provider, allowing functions to be developed without concerns for implementing, tweaking, or scaling a server. The serverless computing environment provides a means to achieve the serverless purpose to allow developers to execute code in response to events without building out or maintaining a complex infrastructure. Instead of scaling a monolithic hardware device to handle potential load, a service can be split into a bunch of functions which can be scaled automatically and independently.

An end user of such a serverless computing environment may be charged based on per execution time of a function and the amount of resource allocated for the execution of the function. This may be viewed in contrast from other computing environments where a user may be charged for as long as his or her services are launched and running, regardless of whether those servers are processing requests or sitting idle. However, it may not be beneficial if the users deploy all the services to the serverless computing environment due to disadvantages in the aspects of security, dependency, cost, and slow response caused by the cold start.

Work Principle and Example Architecture

According to example embodiments of the present disclosure, there is proposed a solution for offloading a workload from a computing environment to another computing environment. In this solution, a workload of a target function of a service can be offloaded from a first computing environment to a second different computing environment if it is found that the workload of the target function exceeds a current processing capacity of the service available for the target function in the first computing environment. If it is determined to offload the workload of the target function, one or more incoming requests for the target function are routed to the second computing environment. In the second computing environment, a target instance of the target function is provisioned to process the routed incoming request(s).

Through the solution, the workload of a function of a service can be dynamically scheduled between two different computing environments, such as a service-based computing environment and a serverless computing environment. As such, the user requests can be processed timely and effectively. The probability of a system crash due to the request backlogging can be mitigated and the quality of the service can be improved. Further, from the perspective of the users, the maximum throughput can be achieved with a reasonable cost.

Other advantages of the present disclosure will be described with reference to the example embodiments and the accompanying drawings below.

Figure 5:
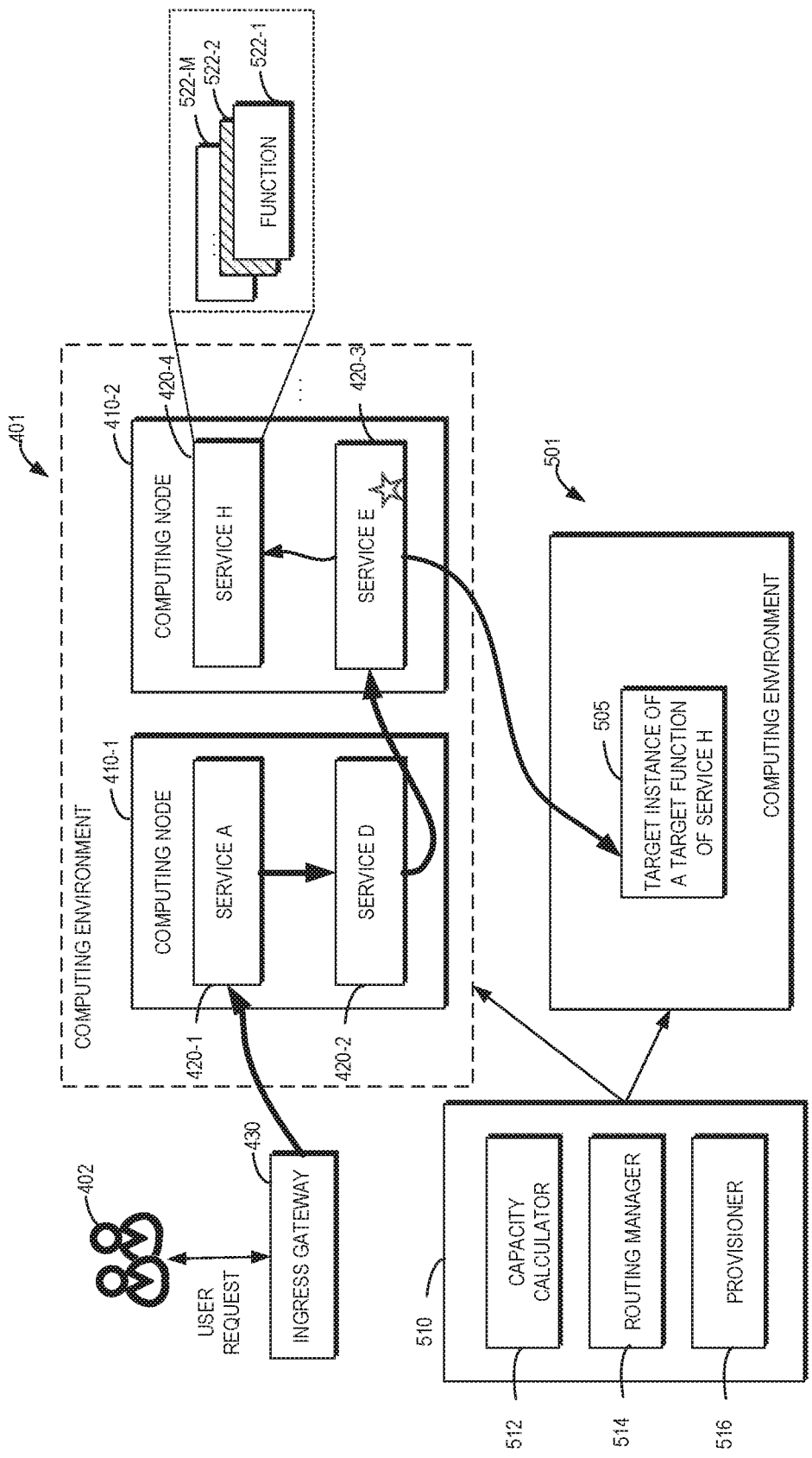
FIG. 5 depicts a block diagram of an example computing architecture in accordance with some embodiments of the present disclosure.

Reference is now made to FIG. 5, which illustrates a block diagram of computing architecture in accordance with some embodiments of the present disclosure. As illustrated in FIG. 5, a computing environment 401 (sometimes referred to as a "first computing environment") and a different computing environment 501 (sometimes referred to as a "second computing environment") are involved.

Computing environment 401 in FIG. 5 may be similar to the one shown in FIG. 4, and may include any service-based computing environment, such as a computing environment based on SaaS, PaaS, and/or IaaS. One or more services, such as services 420-1 to 420-4, are provisioned in computing environment 401, each including one or more functions. Computing environment 501 may be a serverless computing environment such as a computing environment based on FaaS. Although not specifically illustrated in FIG. 5, computing environment 501 also comprises one or more computing nodes, such as servers, to provide the processing and memory resources.

According to embodiments of the present disclosure, a workload scheduling system 510 is configured to determine whether a workload of a target function of a certain service 420 needs to be partially or even totally offloaded from computing environment 401 to computing environment 501. Workload scheduling system 510 is also configured to schedule one or more incoming requests for the target function of service 420 from computing environment 401 to computing environment 501.

To achieve the workload offloading according to embodiments of the present disclosure, workload scheduling system 510 comprises a capacity calculator 512, a routing manager 514, and a provisioner 516. Workload scheduling system 510 and its components may be implemented in software, hardware, firmware, and/or any combination thereof.

Although shown as being separated, the whole workload scheduling system 510 or one or more of its components can be implemented in either computing environment 401 or 501. In other embodiments, the whole workload scheduling system 510 or one or more of its components may be implemented in other computing environments than computing environment 401 or 501.

Provisioner 516 is configured to provision one or more functions (referred to as "target functions") of one or more services 420 in computing environment 501. Since each of the services may include one or more functions, one or more of the functions of services 420 may be selected as a target function(s) which can have its workload offloaded to computing environment 501. In addition to being provisioned in computing environment 401 on the basis of the service, a target function is also instantiated or provisioned in computing environment 501. The instantiation of the target function in computing environment 501 is considered as a target instance of the target function.

In some embodiments, a target function of a service may be selected as the one that has a higher probability of having a relatively higher workload during operation and/or has a lower level of security requirement. In some embodiments, one or more target functions may be specified by a user such as an administrator of services 420. In some embodiments, one or more target functions may be automatically recommended to the user. By way of illustration, among functions 522-1, 522-2, . . . , 522-M (collectively or individually referred to as functions 522, where M is an integer larger than or equal to one) of service "H" 420-4, one of the functions 522 of service "H" 420-4, for example, function 522-2, is selected as a target function and is further provisioned as a target instance 505 in computing environment 501. Some detailed embodiments for the provisioning of the target instance for the target function will be described below.

It would be appreciated that one or more other functions 522 of service "H" 420-4 and/or one or more functions of other services 420 may be additionally or alternatively provisioned in computing environment 501. For the purpose of illustration only, a function 522-2 of service 420-4 is described as an example of the target function in the following embodiments. Other target functions of any services 420 can be likewise provisioned in computing environment 401 and thus their workloads can likewise be scheduled by workload scheduling system 510.

In workload scheduling system 510, capacity calculator 512 is configured to determine a workload of target function 522-2 of service 420-4 in computing environment 401. In some embodiments, the workload of target function 522-22 may be dynamically determined based on the number of incoming requests per time unit, that is, the rate of incoming requests for target function 522-2. As an example, the rate of incoming requests may be represented in request per second (RPS).

Capacity calculator 512 is further configured to determine a processing capacity of service 420-4 that can be allocated for executing requests for target function 522-2 in computing environment 401. A total processing capacity of service 420-4 in computing environment 401 may generally depend on the resources provisioned for this service, which may be scaled if required. For example, one or more VMs or containers can be provisioned to run the service in computing environment 401. The total processing capacity of service 420-4 is allocated among different functions 522.

Even if only one function 522 is comprised, the number of incoming requests for each function of the service varies over time.

As the total processing capacity of service 420-4 is to be split to process varied numbers of incoming requests for functions 522, the processing capacity of service 420-4 available for target function 522-2 may be varied over time. In some embodiments, the processing capacity for target function 522-2 may be estimated based on the number of requests that have been processed by target function 522-2 in computing environment 401. Some detailed embodiments for the determination of the workload and the processing capacity will be described below.

Routing manager 514 in workload scheduling system 510 is configured to control the routing of incoming requests for target function 522-2. Due to the variations of the workload and the available processing capacity, sometimes the processing capacity for target function 522-2 may be insufficient for handling its current workload. Routing manager 514 determines whether the workload of target function 522-2 exceeds the processing capacity of service 420-4 that can be allocated for target function 522-2 in computing environment 401. If the workload of target function 522-2 is determined to be beyond the processing capacity, it means that service 424-4 does not have enough capacity to handle the workload of target function 522-2. In such a case, routing manager 514 is configured to cause one or more incoming requests for target function 522-2 to be routed to its target instance 505 provisioned in computing environment 501.

The requests for target function 522-2 of service 420-4 may originate, depending on the dependency of services 420-4, with other services 420. In the illustrated example, as service "H" 420-4 is invoked by service "E" 420-3, the requests for target function of service "H" 420-4 may come from service "E" 420-3. Thus, one or more incoming requests from service "E" 420-3 to target function 522-2 are routed to target function 505 in computing environment 501. Although not shown, one or more incoming requests for target function 522-2 may come from other services and/or end user(s) 402.

In some embodiments, routing manager 514 may be configured to route some of the incoming requests to service "H" 420-4 provisioned in computing environment 401. Service "H" 420-4, operating in a container or a VM deployed in computing environment 401, may process the incoming requests for target function 522-2 with the available processing capacity. That is, the incoming requests for target function 522-2 of service 420-4 may be split to computing environment 401, and computing environment 501 in the case that the current workload is detected to exceed the processing capacity for target function 522-2 in computing environment 401.

As a result, the workload of target function 522-2 in computing environment 401 can be properly offloaded, avoiding the overload of target function 522-2 of service 420-4 occurring in computing environment 401. As the auto-scaling of service in computing environment 401 is not the only choice to increase the maximum throughput of target function 522-2, the service performance and throughput can be incased with reasonable cost.

Provisioning, workload monitoring, capacity calculation and routing management in workload scheduling system 510 will be discussed in detail in the following.

Detailed Implementations of the Workload Scheduling System

Figure 6:
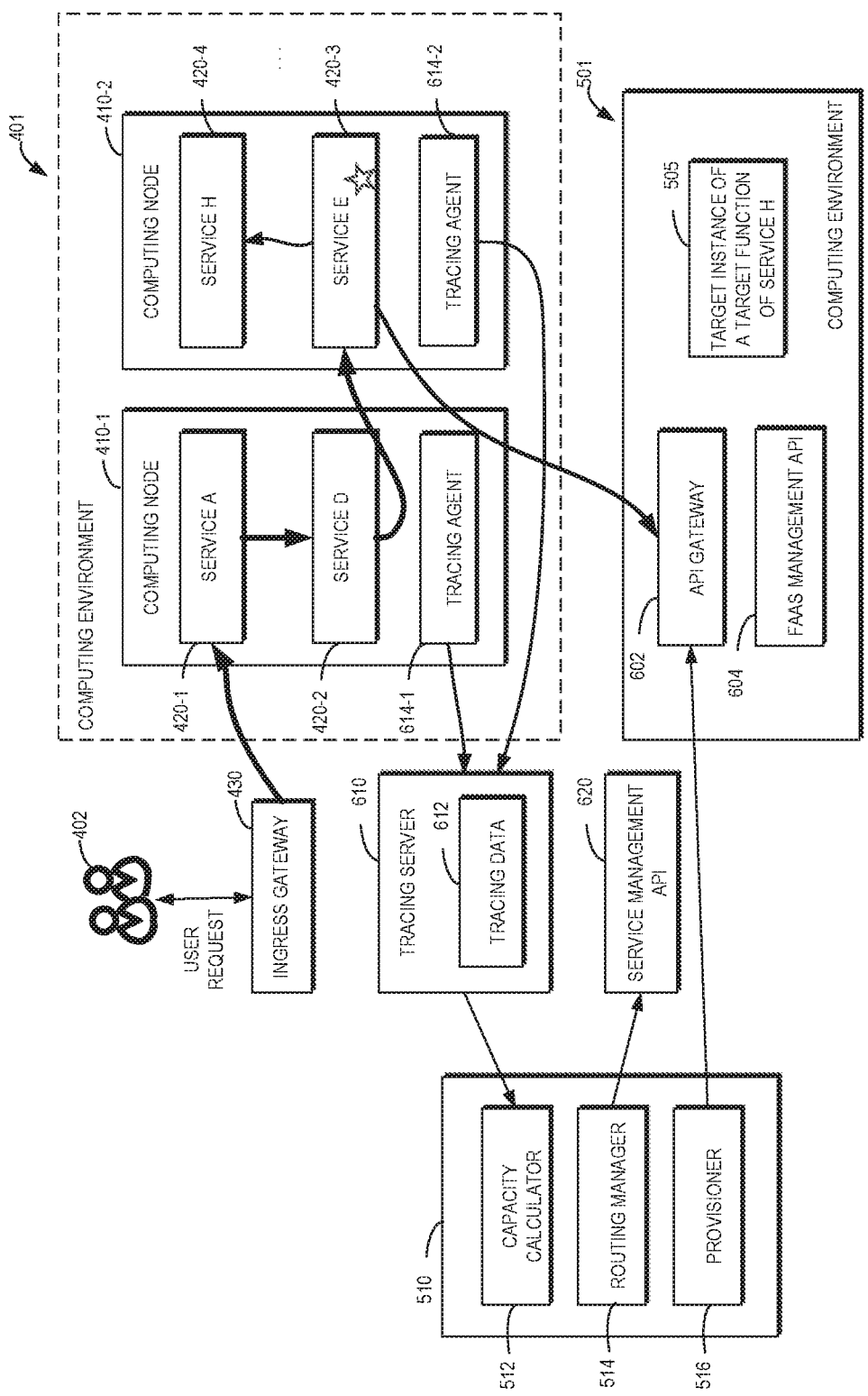
FIG. 6 depicts a block diagram of an example of the computing architecture of FIG. 5 in accordance with some embodiments of the present disclosure.

FIG. 6 illustrates a block diagram of an example of the computing architecture of FIG. 5 in accordance with some embodiments of the present disclosure. In the illustrated example of FIG. 6, capacity calculator 512 is configured to communicate with a tracing server 610 which collects trace data 612 from tracing agents 614-1, 614-2 deployed in computing nodes 410-1, 410-2 of computing environment 401. Trace data 612 may include information on execution of requests by services 420, specifically, information on execution of requests by respective functions of services 420. An example of such information may include an operation name of the function, a start timestamp and finish timestamp of execution of a request by the function, a context of the execution of the function, a set of key-value pairs indicating tags recorded for the function, a set of key-value pairs indicating logs recorded for the function, and/or any other information that is related to the execution of the function.

In some embodiments, tracing server 610 may be configured to collect trace data 612 according to an OpenTrace data model. According to the OpenTrace data model, a function is modeled as a span which is a single-hosted view of an operation, a trace is a series of spans which nest to form a latency tree. The span is the primary building block of a distributed trace, representing an individual unit of execution done in a distributed system. Each component of the distributed system contributes a span, which is a named, timed operation representing a piece of the workflow. As used herein, a span in the OpenTrace data model is corresponding to a function of a service. The information on the execution of the function may be encapsulated corresponding execution status information according to the OpenTracing specification. In addition to the OpenTrace data model, or as alternatives, trace data 612 may be collected according to any other execution tracking models or techniques. The scope of the present disclosure is not limited in this regard.

Capacity calculator 512 may obtain the part of trace data 612 that is related to target function 522-2, analyze the obtained information to determine the workload of target function 522-2, and the processing capacity for target function 522-2 in computing environment 401, as will be discussed below.

As further illustrated in FIG. 6, in order to enable communication with computing environment 401 to control the routing of incoming requests for target function 522-4, routing manager 514 is configured to create and update a service management API 620. Service management API 620 may be, for example, based on service mesh management. In order to enable communication with computing environment 501 to provision and manage target instance 505 of target function 522, provisioner 516 is configured to interact with a FaaS management API 604 via API gateway 602 deployed in computing environment 501. The incoming requests for target function 522-2 may be routed to target instance 505 provisioned in computing environment 501 through FaaS management API 604 via API gateway 602.

As used herein, an API defines interfaces used to facilitate communication or interaction between different systems or software modules. The API may specify the interfaces, methods, and classes for the communications. The two communication parties can interact with each other by monitoring the API. An API gateway (for example, an Open, RESTful (representational state transfer) API gateway) monitors and control distribution of requests to one or more APIs. It would be appreciated that in addition to the APIs and API gateways, other interface techniques can also be applied to achieve communication or interaction among workload offloading system 510, computing environment 401, and computing environment 501.

In some embodiments as mentioned above, a user, such as an administrator of a service, is allowed to specify a target function of a service to be provisioned in computing environment 501 for workload offloading. The user may also be allowed to customize a configuration of provisioning of the target function in computing environment 501. In some embodiments, one or more API objects related to a target function may be defined and provisioned in computing environment 401 to facilitate provisioning, workload monitoring, capacity calculation, and the routing management of this target function in workload scheduling system 510. As used herein, an API object is created, when executed, to perform the specified function using one or more parameters.

Figure 7:
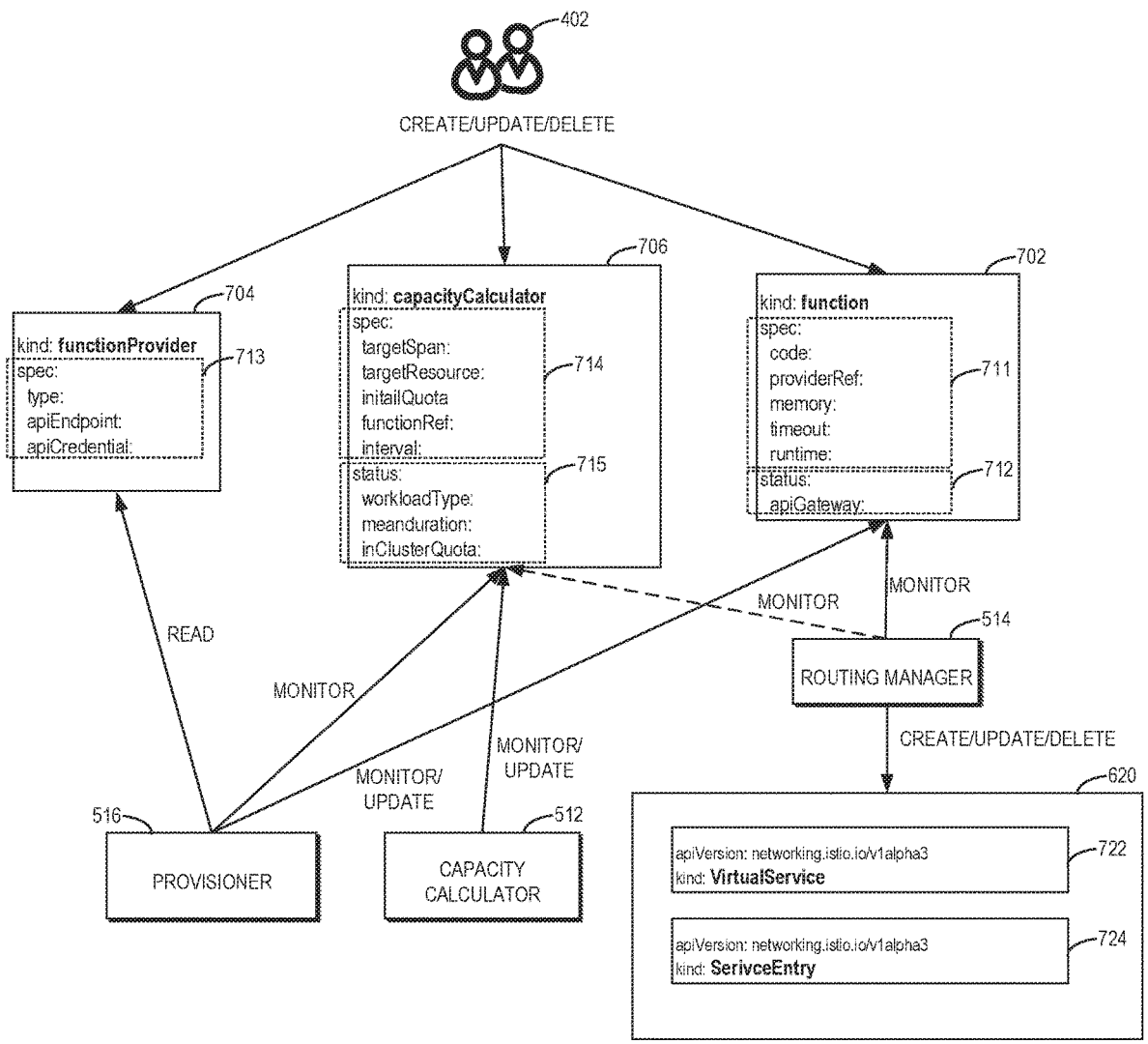
FIG. 7 depicts an example of workload scheduling for a target function according to definitions of API (application programming interface) objects in accordance with some embodiments of the present disclosure.

FIG. 7 illustrates an example of workload scheduling for a target function according to definitions of API objects in accordance with some embodiments of the present disclosure. As illustrated, API objects 702, 704, and 706 are created for target function 522-2 of service 420-4, for example, by a user 402 as an administrator of service 420-4. API objects 702, 704, and 706 may be generated in computing environment 401. API objects 702, 704, and 706 may be updated if configurations related to target function 522-2 are changed. API objects 702, 704, and 706 may also be deleted if the corresponding target function 522-2 is not desired to be provisioned in computing environment 501.

API objects 702 and 704, defined with a name of a "function" API object and a "functionProvider" API object, respectively, may be used to facilitate provisioning of target function 522-2 by provisioner 516 and the routing of incoming requests to target instance 505 of this target function 522-2 by routing manager 514. API object 706, defined with a name of "capacityCaculator" API object, may be used to facilitate the workload monitoring and capacity calculation, the routing of the incoming request for target function 522-2, and possibly adjustment of a configuration of the provisioning of target function 522-2.

In the following, the provisioning of target instance 505 implemented at provisioner 516, the capacity calculation for target function 522 implemented at capacity calculator 512, and the routing of the incoming requests implemented at routing manager 514 will be discussed in detail with reference to FIGS. 6-7 as well as other figures.

Provisioning of Target Instance by the Provisioner

When an API object 702 is created, it means that a target function of a service 420 provisioned in computing environment 401 is specified to be further provisioned in computing environment 501. API object 702 includes a specification ("spec") part 711 to indicate a configuration for provisioning a target instance 505 of target function 522-2 in computing environment 501. Specification part 711 includes a plurality of fields with parameters defined for target function 422-2 to be provisioned.

API object 702 further includes a status part 712 including an "apiGateway" field which indicates an access destination of target instance 505 in computing environment 501. This access destination may be obtained after target instance 505 of target function 522-2 has been provisioned in computing environment 501. In some examples, the access destination may be indicated by a uniform resource locator (URL).

Example fields of specification part 711 and status part 712 in API object 702 and related description are summarized in the following table, Table 1.

TABLE 1

Example fields in API object 702 and related description

| Fields | Type | Description |
| --- | --- | --- |
| code | string | The encoded contents of the deployment package for the target function |
| providerRef.name | string | A provider of computing environment 501 specified for the target function |
| memory | string | A size of the memory allocated to the target function |
| timeout | string | The time duration that allows the target function to run before this function is stopped |
| runtime | sting | The runtime environment for the target function, such as nodejs8.10, nodejs10.x, java8, python2.7, or the like |
| apiGateway | object | An access destination to the target function provisioned in computing environment 501, that is, an access destination to the target instance of the target function |

It would be appreciated that although various fields in API object 702 have been described for configuring target instance 505, one or more of the fields may be omitted in some examples, and one or more other fields may be added. As an example, field "timeout" and/or field "runtime" may not need to be specified in API object 702.

An example of API object 702 with the parameters of the fields specified is provided in the following table, Table 2. It would be appreciated that the detailed parameters provided in Table 2 are merely for the purpose of illustration without suggesting any limitation to the scope of the present disclosure.

TABLE 2

Example of API object 702

```
apiVersion: networking.serverless-switcher.io/v0.1
kind: function
spec:
    code: . . .
    providerRef:
        name: lambda
    memory: 128M
    timeout: 60s
    runtime: nodejs8.10
status:
    apiGateway:
        host: te6si5ach7.execute-api.us-west-2.amazonaws.com
        uri: /prod/function1
        protocol: HTTPS
        port: 443
```

As illustrated in FIG. 7, provisioner 516 may monitor whether an API object 702 is created in computing environment 401. If API object 702 is created, such as the example shown above in Table 2, provisioner 516 may read the parameters defined in the fields of specification part 711. As such, provisioner 516 may deploy the code of target function 522-2 as a target instance 505 in computing environment 501. Target instance 505 may be provided by the provider specified in API object 702, with a configuration of the memory size, the timeout, and the runtime specified in API object 702.

As further illustrated in FIG. 7, provisioner 516 may also read API object 704 which includes information needed to communicate with computing environment 501 to provision target function 522-2. In the shown example, API object 704 includes a specification part 713 including a plurality of fields with parameters defined for access to target function 422-2 in computing environment 501. Example fields of specification part 713 in API object 704, and related description, are summarized in the following table, Table 3.

TABLE 3

Example fields in API object 704 and related description

| Fields | Type | Description |
|---|---|---|
| type | string | The type of an API to access computing environment 501 |
| apiEndpoint | object | An API endpoint |
| apiCredential | object | Credential information used against the API endpoint |

In some embodiments, after target instance 505 of target function 522-2 has been provisioned in computing environment 501, provisioner 516 obtains the access destination of target instance 505 of target function 522-2. Provisioner 516 may update the status part 712 of API object 702 with the access destination, as in the example of Table 2. In this way, target instance 505 of target function 522-2 may be bound with the access destination, such as the address of API gateway 602 in computing environment 501.

Generally, the parameters in API object 702 may be initially defined by user 402 or specified using default values. The configuration of target instance 505 may be further optimized by provisioner 516. In some embodiments, provisioner 516 may monitor information on execution of one or more requests (for example, historical requests) for target function 522-2 in computing environment 401, and determine an adjustment to the current configuration of target instance 505 based on the monitored information. If an adjustment to the current configuration is determined to be necessary, provisioner 516 may cause provisioning of target instance 505 in computing environment 501 to be reconfigured according to the adjustment to the current configuration, so as to further optimize provisioning of target instance 505 as target function 522-2 operates.

The information on execution of requests may be obtained from trace data 612. Provisioner 516 may obtain the information by monitoring API object 706, which is configured to facilitate obtaining information on execution related to the target function from trace data 612 maintained at tracing server 510, as will be further discussed below.

The information on the execution of a request by target function 522-2 may indicate a start timestamp and finish timestamp of execution of the request by target function 522-2. Accordingly, it is possible to determine execution duration of a request by target function 522-2 based on the start and finish timestamps.

According to statistics on the execution duration of a number of requests, such as by determining mean execution duration of the requests, provisioner 516 may determine whether the current setting of the timeout for target instance 505, such as the parameter of the field "timeout" in API object 702, is appropriate or not. For example, if the mean execution duration is relatively large, the timeout may be set to a larger value. Provisioner 516 may monitor API object 706 to obtain the real-time or latest mean execution duration for target function 522-2, which may be determined by capacity calculator 512 as discussed below.

In some embodiments, provisioner 516 may determine a workload type of target function 522-2 based on the information on the execution of the requests. Provisioner 516 may monitor API object 706 to obtain the real-time or latest workload type of target function 522-2 which may be determined by capacity calculator 512 as discussed below.

A possible workload type may include an Input/Output (I/O) or network bounded workload type. The I/O, or network bounded workload type, generally suffers from compromised I/O or network resources availability, but has a lower requirement on memory resources. Other workload types may include a compute bounded workload type, such as a central processing unit (CPU) bounded workload type, a memory bounded workload type, and/or the like. The workloads of such types may require more compute resources and memory resources to support the high performance.

The workload type may be determined by comparing the execution duration of a request of target function 522-2 and a sum of execution duration of immediate sub-operations required by the execution of the request. Information on the execution of the sub-operations may also be obtained from trace data 612.

Figure 8A:
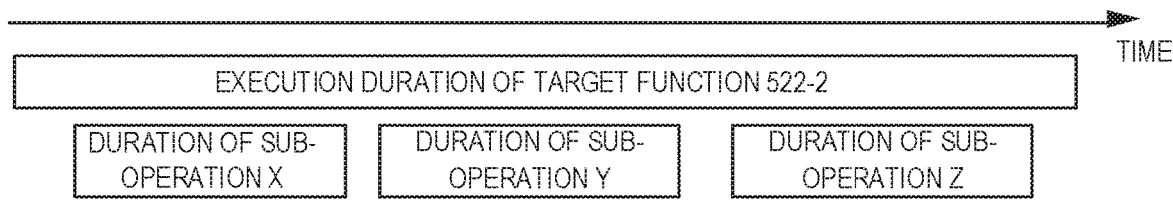
FIG. 8A is a first graph view showing a portion of the execution duration of the target function and its sub-operations, over time, in accordance with some embodiments of the present disclosure.

As shown in FIG. 8A, graph 800 depicts target function 522-2 having sub-operations X, Y, Z, and their execution durations over time. To determine the workload type of target function 522-2, provisioner 516 may determine a ratio of the sum of the execution duration of the sub-operations (X, Y, Z) to the execution duration of target function 522-2. If the ratio is relatively large, for example, larger than a threshold, it means that the execution by target function 522-2 spends most of the time in sub-operations, then the workload type of target function 522-2 may be an I/O or network bounded workload type. Otherwise, the workload type of target function 522-2 may be different, such as the CPU-bounded or memory bounded workload type.

Figure 8B:
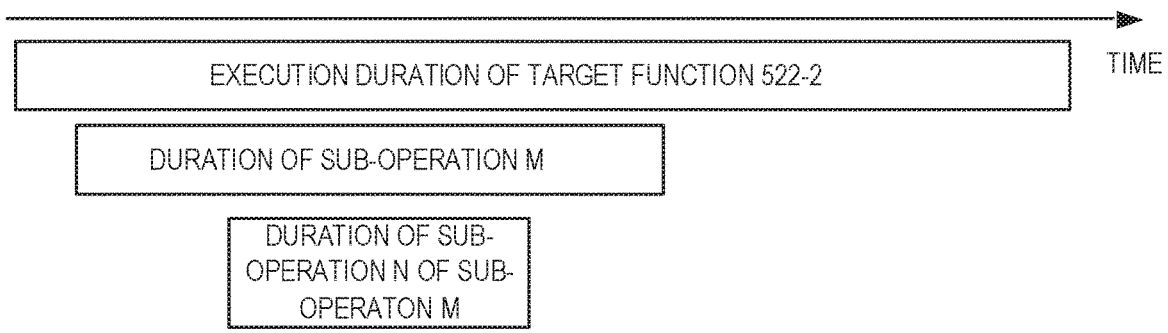
FIG. 8B is a second graph view further showing a portion of the execution duration of the target function and its sub-operations, over time, in accordance with some embodiments of the present disclosure.

Further, as shown in FIG. 8B, graph 850 shows target function 522 having a sub-operation M which further has a sub-operation N. In this example, a ratio of the execution duration of the direct sub-operation M to the execution duration of target function 522-2 is determined. Similarly, in this case, if the ratio is larger than the predetermined threshold, the workload type of target function 522-2 may be an I/O or network bounded workload type.

In some embodiments, if the workload type of target function 522-4 is the I/O or network bounded workload type, provisioner 516 may make a determination to adjust the memory size allocated to target instance 505, for example, to set the parameter of the "memory" field in API object 702 to a lower value.

In some embodiments, if one or more parameters of the fields in API object 702 determine that an update is needed, provisioner 517 may accordingly reconfigure the provisioning of target instance 505 in computing environment 501.

Capacity Calculation by the Capacity Calculator

As briefly mentioned above, capacity calculator 512 is configured to monitor the workload of target function 522-2 of service 420-4 in computing environment 401 and determine the processing capacity available for target function 522-2 in computing environment 401.

Capacity calculator 512 may determine the workload of target function 522-2 of service 420-4 in computing environment 401. The workload may be determined based on the information on execution of requests for target function 522-2. In some embodiments, capacity calculator 512 may monitor API object 706 created for target function 522-2. Reference can be made back to FIG. 7, where API object 706 includes a specification part 714 which includes parameters which can facilitate determining which part of whole trace data 612 is related to target function 522-2. The parameters of the fields in specification part 714 may be specified by user 402.

API object 706 further includes a status part 715 which also includes a plurality of fields. The plurality of fields may be determined after capacity calculator 512 obtains and analyzes the information on execution of the requests for target function 522-2. Capacity calculator 512 may update those fields of status part 715. In some embodiments, capacity calculator 512 may continuously monitor the execution of the requests by target function 522-2 and update status part 715 of API object 706 if any update is determined to be needed. The monitor and update may be triggered periodically or by a change to the provisioning of service 420-4 in computing environment 401.

Example fields of specification part 714 and status part 715 in API object 706 and related description are summarized in the following table, Table 4.

TABLE 4

Example fields in API object 706 and related description

| Fields | Type | Description |
| --- | --- | --- |
| targetSpan.operationName | string | The operation name of the span (corresponding to the target function) with which capacity calculator 512 can query tracing server 610 to get the related information |
| targetResource | Object | Indicating the resource(s) deployed in computing environment 401 for the target function |
| initailQuota | Object | An initial quota for rate limiting on the target function |
| functionRef.name | string | Indicating the name of the target function to be deployed in computing environment 501 |
| interval | sting | Time interval the capacity calculator should run for the target function |
| workloadType | string | The workload type of the target function, for example, I/O bounded workload type, CPU bounded workload type, or the like |
| meanDuration | string | The mean execution duration of requests for the target function |
| inClusterQuota | Object | The quota determined by capacity calculator 512 for rate limiting on the target function |

After capacity calculator 512 determines and updates the fields "workloadType" and "meanDuration," provisioner 516 may monitor API object 706 to obtain the workload type and the mean execution duration to reconfigure the provisioning of target instance 505, as described above. It would be appreciated that although various fields in API object 706 have been described, one or more of the fields may be omitted in some examples, and one or more other fields may be added. As an example, the field "workloadType" and/or the field "meanDuration" may not need to be specified in API object 702.

An example of API object 706 with the parameters of the fields specified is provided in the following table, Table 5. It would be appreciated that the detailed parameters provided in Table 5 are merely for the purpose of illustration without suggesting any limitation to the scope of the present disclosure.

TABLE 5

Example of API object 706

```
apiVersion: networking.serverless-switcher.io/v0.1
kind: capacityCalculator
spec:
    targetSpan:
        operationName: "serviceH.default.cluster.local/function1"
    targetResource:
        host: serviceH.default.cluster.local
        path: "/function1"
        resourceRef:
            kind: deployment
            name: serviceH
    initialQuota:
        maxAmount: 50
        validDuration: 60s
        bucketDuration: 1s
    functionRef:
        name: function1OfService1
    interval: 5
status:
    workloadType: CPU-bound
    meanDuration: 0.2s
    inClusterQuota:
        maxAmount: 50
        validDuration: 60s
        bucketDuration: 1s
```

In some embodiments, the workload of target function 522-2 and the processing capacity for target function 522-2 can change relatively frequently, where reasonable values for the workload and processing capacity need to be determined among all the instantaneous values. In some embodiments, a process of modeling the problem of workload offloading will be described below.

Some symbols to be used are first defined in the following table, Table 6:

TABLE 6

Symbols definitions

| Symbol | Definition |
| --- | --- |
| $C_k$ | Processing capacity for the target function, where k indicates that number of containers/pods/VMs provisioned for the corresponding service, such as the number of pod 440 for service 420-4; represented as RPS |
| $\hat{R}$ | A rate of incoming requests needed to be processed by the target function in computing environment 401, represented as RPS |
| R | A rate of incoming requests arrived at the target function, represented as RPS, which is corresponding to the workload of the target function |
| L | A rate limit imposed on the target function in computing environment 401 |
| Q | A number of requests pending for processing (backlogged requests) |
| F | The rate of offloading the requests to computing environment 501 |
| Q' | The change or variation of Q |

The change of Q, that is, the change of the number of requests pending for processing, at a time point t may be represented as follows:

$$Q'(t) = \begin{cases} 0, & C_k(t) \geq \hat{R}(t) \\ \hat{R}(t) - L(t) - F(t), & C_k(t) < \hat{R}(t) \end{cases} \quad \text{Equation (1)}$$

$$L(t) = \lambda C_k(t) \text{ where } \lambda < 1 \text{ but may be close to 1} \quad \text{Equation (2)}$$

In the above Equation (1), if $C_k(t) \geq \hat{R}(t)$, which means that the processing capacity at time point t is sufficient enough to process the incoming requests needed to be processed by target function 522-2, then the number of requests pending for processing will not be increased. If $C_k(t)<\hat{R}(t)$, which means that the processing capacity at time point t is insufficient, the increase of the number of pending requests is determined based on the rate of incoming requests needed to be processed $\hat{R}(t)$, the rate limit on target function L(t), and the rate of offloading the requests F(t) at time point t.

In some embodiments, rate limit L is imposed here to avoid using up the processing capacity for target function 522-2. The workload of target function 522-2 may be compared with rate limit L to determine whether one or more incoming requests should be routed to computing environment 501. According to Equation (2), rate limit L at a time point t may be determined by weighting the processing capacity with a predetermined weight $\lambda$ so as to preserve some margin from the processing capacity. In some examples, the weight $\lambda$ may be a value approximate to, but is smaller than 1, for example, may be larger than 0.5 but is smaller than 1.

According to Equation (1), the problem of calculating the processing capacity may be established as follows: if $C_k(t)<\hat{R}(t)$, the processing capacity $C_k$ can be determined and may be used to determine rate limit L to limit the number of incoming requests processed by computing environment 401. Excessive incoming requests for target function 522-2 can be routed to computing environment 501.

Figure 9:
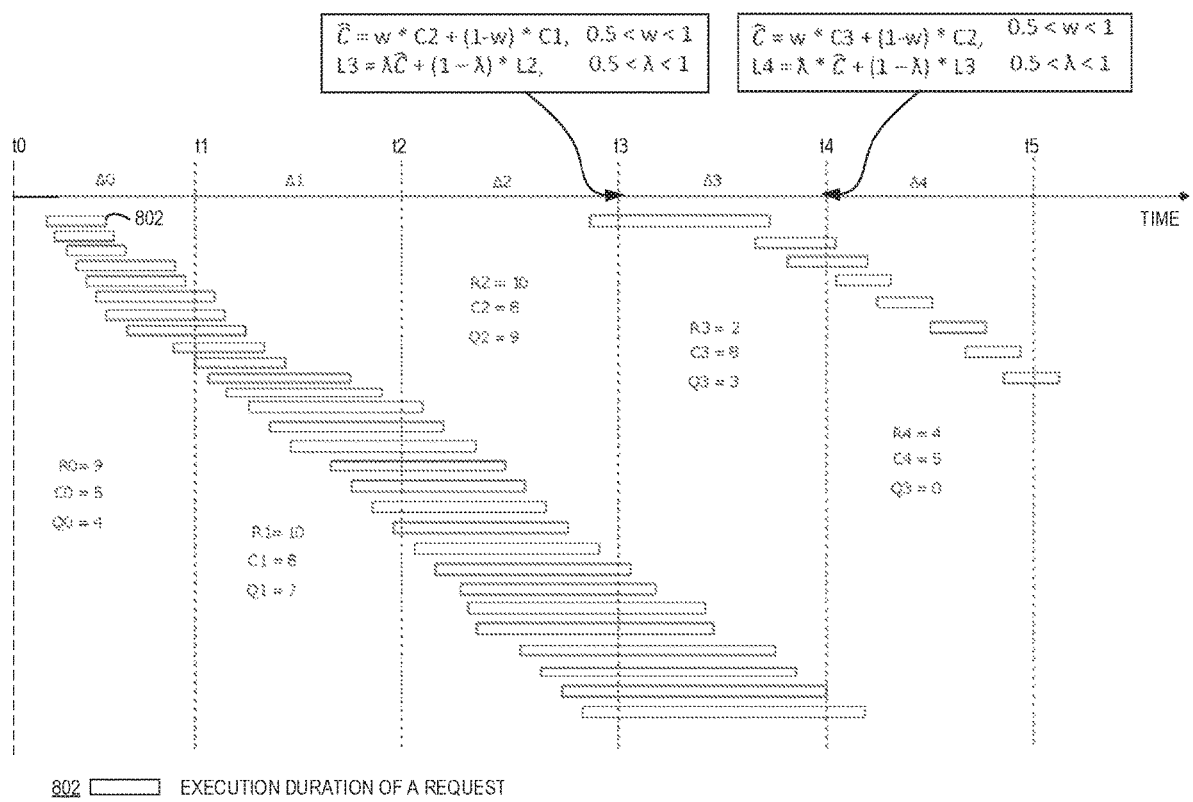
FIG. 9 depicts a schematic diagram of distribution of requests for the target function over time in accordance with some embodiments of the present disclosure.

At capacity calculator 512, the information on execution of requests can be obtained from trace data 612. The information may indicate the duration, the start timestamp, and the finish timestamp for target function 522-2 upon each request. If execution of a request is not complete, the finish timestamp may be invalid. According to this information, it is possible to determine the number of the requests at different time points and possible execution duration of the requests. FIG. 9 illustrates a schematic diagram of distribution of execution durations of requests over time in accordance with some embodiments of the present disclosure. In FIG. 9, execution duration 802 of the requests for target function 522-2 are arranged along the time axis according to their start timestamp.

To solve the above established problem, the requests may be observed in respective time intervals. The time intervals may be specified by the user or may be a predetermined value. For a time interval $\Delta$, capacity calculator 512 may have the following parameters based on the information on execution of requests:

- the total number of requests (represented as N) arrived at target function 522-2 in computing environment 401 within the time interval, which may represent the workload of target function 522-2 in the time interval; hence the rate of incoming requests R at this time interval may be determined as: $R=N/\Delta$;
- the total number of requests (represented as M) that has been processed by target function 522-2 within the time interval; hence, the processing capacity at the time interval is $C_k=M/\Delta$;
- the total number of incomplete requests (represented as S) by target function 522-2 within the time interval; hence, the number Q of requests pending for processing at that time interval: $Q=S=N-C_k$.

In the illustrated example of FIG. 9, the parameters R, C (corresponding to "$C_k$" indicated above), and Q are labeled in association with each time interval from $\Delta 0$. The digits (0, 1, 2, 3, and 4) in connection with the parameters R, C, and Q indicate the corresponding time intervals.

For two adjacent time intervals $\Delta(t)$ and $\Delta(t+1)$, the change of Q may be determined as $Q'=[Q(t+1)-Q(t)]/\Delta$. Based on the above analysis, in some embodiments, if capacity calculator 512 determines whether the processing capacity $C_k$ is less than the workload of target function 522-2 by monitoring whether Q' is less than 0. In other words, if the number of requests pending for processing is increasing, it may indicate that the rate of incoming requests overshoots the current processing capacity for target function 522-2. In such a case, the workload at target function 522 in computing environment 401 may be offloaded to computing environment 501.

More particularly, capacity calculator 512 may determine, from the information on execution of the requests, the respective number of requests pending for processing in a plurality of time intervals, such as successive time intervals. Capacity calculator 512 may determine the change of the number of requests pending for processing across the time intervals. If it is determined that the number of requests Q pending for processing is increasing from a time interval to one or more following time intervals, capacity calculator 512 may determine that offloading of the workload of target function 522-2 may be needed. In such a case, capacity calculator 512 may determine that the target function is to be in a rate-limit status in computing environment 401 for a future time interval. In the rate-limit status, the incoming requests for target function 522-2 may not be all routed to service 420-4, but some of them are instead routed to target instance 505.

For example, at time point t3, capacity calculator 512 determines that the number of requests Q is increasing from $\Delta 0$ to $\Delta 2$ (for example, Q0=4, Q1=7, and Q2=9), which indicates target function 522-2 in computing environment 401 cannot quickly and timely process the incoming request.

In some embodiments, upon determination that the target function is to be in the rate-limit status, capacity calculator 512 estimates, at time point t3, a processing capacity for the following time interval (for example, $\Delta 3$) based on the processing capacities of two time intervals, as $\hat{C}=w*C2+(1-w)*C1$, where w is a predetermined weight, which may be set larger than 0.5 but smaller than 1. To implement the rate limit, in some embodiments, capacity calculator 512 may determine rate limit L3 for the following time interval 43 based on the processing capacity $\hat{C}$. In an example, capacity calculator 512 may determine rate limit L3 based on the processing capacity $\hat{C}$ and rate limit L2 determined from the previous time interval. Predetermined weight $\lambda$ may be used to weight the processing capacity $\hat{C}$ and rate limit L2, which may be set larger than 0.5 but smaller than 1.

In some embodiments, if it is determined that the number of requests Q pending for processing is decreasing from a time interval to one or more following time intervals, capacity calculator 512 may determine that offloading of the workload of target function 522-2 may not be necessary. In such a case, capacity calculator 512 may determine that the target function is to be in a non-rate-limit status in computing environment 401 for a future time interval. In the non-rate-limit status, the incoming requests for target function 522-2 may not be routed to target instance 505 in computing environment 501. For example, at time point t4, capacity calculator 512 determines that the number of requests Q is increasing from $\Delta 2$ to $\Delta 3$ (for example, Q2=9, Q3=3), which indicates target function 522-2 in computing environment 401 can quickly and timely process the incoming request.

In some embodiments, upon determination that the target function is to be in the non-rate-limit status, although the rate limit is not needed for routing the requests, capacity calculator 512 may still estimate at time point t4 a processing capacity and rate limit L4 for the following time interval Δ4, as illustrated in FIG. 9. Rate limit L4 can be used in determining other rate limits for the following time intervals.

As the processing capacity and rate limit for the target function change dynamically, according to some embodiments of the present disclosure, the offloading can be updated accordingly to ensure high performance.

Request Routing by the Routing Manager

Routing manager 514 is configured to rout one or more incoming requests for target function 522-2 to target instance 505 in the computing environment. Reference can be made back to FIG. 7, where routing manager 514 may monitor API objects 702, 704, or 706. If any of the API objects 702, 704, or 706 is created for a target function 522-2, routing manager 514 may create a routing object 722 in service management API 620.

As mentioned above, API object 702 is updated with the access destination for target instance 505 in the field "apiGateway" of API object 702. If routing manager 514 monitors the update to API object 702, it may obtain the access destination of the target instance and include the access destination into routing object 722. If the field "apiGateway" of API object 712 is updated, routing manager 514 may further create a service entry object 724 in service management API 620.

To enable the routing of incoming requests across computing environments 401 and 501, routing object 722 may include a fallback part, which may be set to be "true" when the rate limit/offloading is applicable for target function 522-2, or to be "false" if the processing capacity is enough for the workload of the target function.

An example of routing object 722 and an example of service entry object 724 are provided in the following tables, Tables 7 and 8. It would be appreciated that the detailed parameters provided in Tables 7 and 8 are merely for the purpose of illustration without suggesting any limitation to the scone of the present disclosure.

TABLE 7

Example of routing object 722.

apiVersion: networking.istio.io/v1alpha3
kind: VirtualService
spec:
  hosts:
  - serviceH.default.cluster.local
  http:
  - match:
    - uri:
      exact: /function1
    route:
    - destination:
      host: serviceH.default.cluster.local
  - match:
    - uri:
      exact: /function1
    fallback: true
    route:
    - destination:
      host:
      te6si5ach7.execute-api.us-west-2.amazonaws.com TABLE 7-continued Example of routing object 722.

rewrite:
      uri: /prod/function1

TABLE 8

Example of service entry object 724 apiVersion: networking.istio.io/v1alpha3
kind: ServiceEntry
spec:
  hosts:
  - te6si5ach7.execute-api.us-west-2.amazonaws.com
  location: MESH_EXTERNAL
  ports:
  - name: http
    number: 443
    protocol: HTTPS
  resolution: DNS Routing manager 514 may obtain the workload and the processing capacity of target function 522-2 by monitoring API object 706 or otherwise so as to determine when the routing to computing environment 501 is needed. In some embodiments, routing manager 514 may be configured to route the incoming requests for target function 522-2 to target instance 505 in computing environment 501, such that the remaining workload can be handled by the current processing capacity. In some embodiments, routing manager 514 may route any incoming request for target function 522-2 that is beyond rate limit "L" to target instance 505 in computing environment 501.

In some embodiments, routing manager 514 may continuously monitor API object 706 to ensure that the latest rate limiting/offloading is for target function 522-2, based on the current workload and/or processing capacities. If the parameters related to the rate limiting/offloading can be obtained, they are used to update objects 722 and 724.

Example Method

Figure 10:
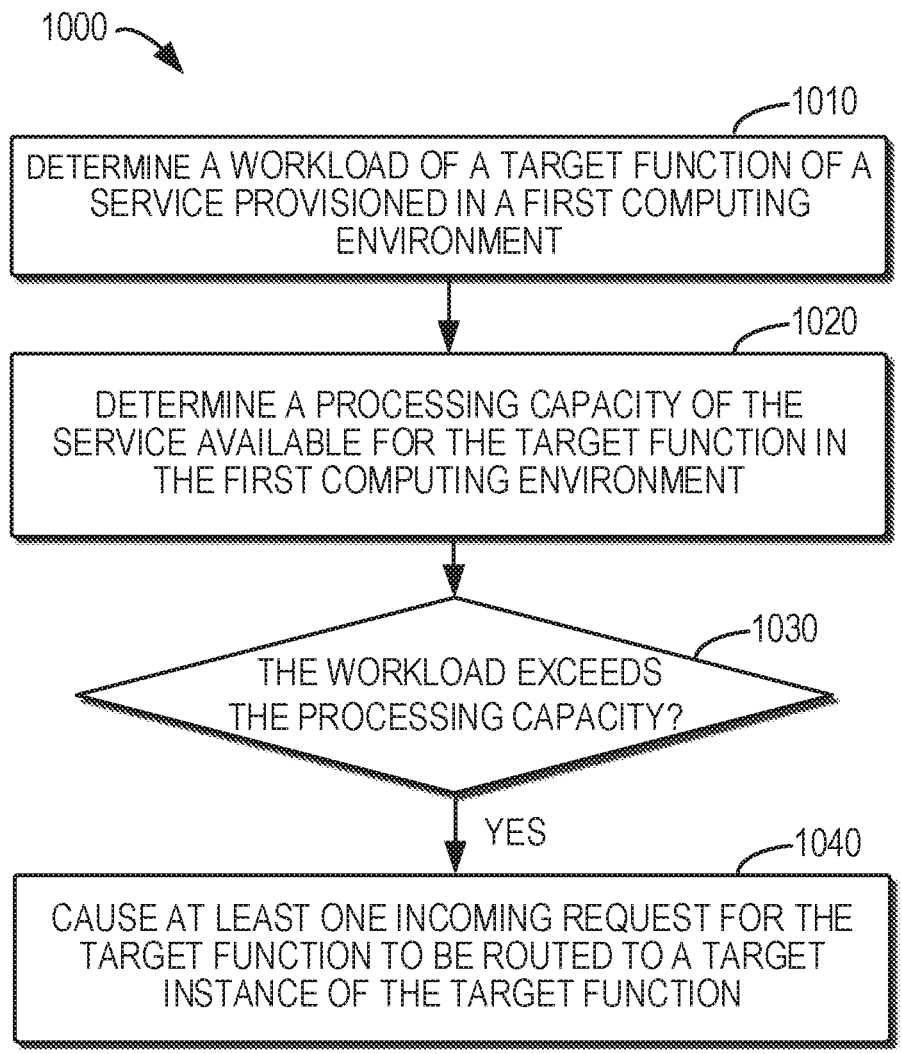
FIG. 10 depicts a flowchart of an example method in accordance with some embodiments of the present disclosure.

FIG. 10 shows a flowchart of an example method 1000 in accordance with some embodiments of the present disclosure. Method 1000 can be implemented at workload scheduling system 510 as shown in FIG. 5. For the purpose of discussion, method 1000 will be described with reference to FIG. 5.

At block 1010, workload scheduling system 510 determines a workload of a target function of a service provisioned in a first computing environment. At block 1020, workload scheduling system 510 determines a processing capacity of the service available for the target function in the first computing environment. At block 1030, workload scheduling system 510 determines whether the workload exceeds the processing capacity. At block 1040, in accordance with a determination that the workload exceeds the processing capacity, workload scheduling system 510 causes at least one incoming request for the target function to be routed to a target instance of the target function, the target instance of the target function being provisioned in a second computing environment different from the first computing environment.

In some embodiments, the second computing environment comprises a serverless computing environment.

In some embodiments, determining the processing capacity comprises: determining the processing capacity based on information on execution of requests for the target function in the first computing environment.

In some embodiments, determining the processing capacity comprises: determining, based on the information on execution of the requests, a change of the number of requests pending for processing from a first time interval to a second time interval after the first time interval; in accordance with a determination that the number of requests pending for processing is increasing from the first time interval to the second time interval, determining that the target function is to be in a rate-limit status in the first computing environment for a third time interval after the second time interval; and in accordance with a determination that the target function is to be in the rate-limit status for the third time interval, determining the processing capacity for the third time interval.

In some embodiments, the causing comprises: in accordance with a determination that the target function is in the rate-limit status for the third time interval, determining whether a workload of the target function within the third time interval exceeds the processing capacity for the third time interval; and in accordance with a determination that the workload exceeds the processing capacity, causing at least one incoming request for the target function to be routed to the target instance of the target function in the second computing environment.

In some embodiments, method 1000 further comprises, in accordance with a determination that the number of requests pending for processing is decreasing from the first time interval to the second time interval, determining that the target function is to be in a non-rate-limit status in the first computing environment for a fourth time interval; and in accordance with a determination that the target function is to be in the non-rate-limit status for the fourth time interval, causing incoming requests for the target function to be routed to the service in the first computing environment without being routed to the target instance of the target function in the second computing environment.

In some embodiments, the causing comprises: determining an access destination of the target instance of the target function in the second computing environment; and causing the at least one incoming request to be routed to the access destination of the target instance.

In some embodiments, the causing comprises: causing at least one incoming request for the target function to be routed to the target instance of the target function such that a remaining workload of the target function is below the processing capacity.

In some embodiments, the target instance of the target function is provisioned in the second computing environment according to a configuration, the method further comprising: obtaining information on execution of at least one request by the target function in the first computing environment; determining an adjustment to the configuration for the target instance based on the obtained information; and causing the target instance of the target function in the second computing environment to be reconfigured based on the determined adjustment to the configuration.

In some embodiments, determining the adjustment to the configuration comprises: determining, based on the obtained information, at least one of the following: a workload type of the target function, or execution duration of a request for the target function; and determining the adjustment to the configuration based on at least one of the workload types or the execution duration of the target function.

It should be noted that the process of offloading workload between computing environments or workload scheduling system 510, according to embodiments of this disclosure, could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
determining a workload of a target function of a service provisioned in a first computing environment;
determining a processing capacity of the service available for the target function in the first computing environment; and
in accordance with a determination that the workload exceeds the processing capacity, causing at least one incoming request for the target function to be routed to a target instance of the target function, the target instance of the target function being provisioned in a second computing environment different from the first computing environment;
wherein determining the processing capacity comprises:
determining, based on the information on execution of the requests, a change of the number of requests pending for processing from a first time interval to a second time interval after the first time interval,
in accordance with a determination that the number of requests pending for processing is increasing from the first time interval to the second time interval, determining that the target function is to be in a rate-limit status in the first computing environment for a third time interval after the second time interval, and
in accordance with a determination that the target function is to be in the rate-limit status for the third time interval, determining the processing capacity for the third time interval.

2. The method of claim 1, wherein the second computing environment comprises a serverless computing environment.

3. The method of claim 1, wherein determining the processing capacity comprises:
determining the processing capacity based on information on execution of requests for the target function in the first computing environment.

4. The method of claim 1, wherein the causing comprises:
in accordance with a determination that the target function is in the rate-limit status for the third time interval, determining whether a workload of the target function within the third time interval exceeds the processing capacity for the third time interval; and
in accordance with a determination that the workload exceeds the processing capacity, causing at least one incoming request for the target function to be routed to the target instance of the target function in the second computing environment.

5. The method of claim 1, further comprising:
in accordance with a determination that the number of requests pending for processing is decreasing from the first time interval to the second time interval, determining that the target function is to be in a non-rate-limit status in the first computing environment for a fourth time interval; and in accordance with a determination that the target function is to be in the non-rate-limit status for the fourth time interval, causing incoming requests for the target function to be routed to the service in the first computing environment without being routed to the target instance of the target function in the second computing environment.

6. The method of claim 1, wherein the causing comprises:

determining an access destination of the target instance of the target function in the second computing environment; and causing at least one incoming request to be routed to the access destination of the target instance.

7. A computer program product comprising:

a set of storage device(s); and computer code stored collectively in the set of storage device(s), with the computer code including data and instructions to cause a processor(s) set to perform at least the following operations:

determining a workload of a target function of a service provisioned in a first computing environment, determining a processing capacity of the service available for the target function in the first computing environment, and in accordance with a determination that the workload exceeds the processing capacity, causing at least one incoming request for the target function to be routed to a target instance of the target function, the target instance of the target function being provisioned in a second computing environment different from the first computing environment, wherein determining the processing capacity comprises:
    determining, based on the information on execution of the requests, a change of the number of requests pending for processing from a first time interval to a second time interval after the first time interval,
    in accordance with a determination that the number of requests pending for processing is increasing from the first time interval to the second time interval, determining that the target function is to be in a rate-limit status in the first computing environment for a third time interval after the second time interval, and
    in accordance with a determination that the target function is to be in the rate-limit status for the third time interval, determining the processing capacity for the third time interval.

8. The computer program product of claim 7, wherein the second computing environment comprises a serverless computing environment.

9. The computer program product of claim 7, wherein determining the processing capacity comprises:

determining the processing capacity based on information on execution of requests for the target function in the first computing environment.

10. The computer program product of claim 7, wherein the causing comprises:

in accordance with a determination that the target function is in the rate-limit status for the third time interval, determining whether a workload of the target function within the third time interval exceeds the processing capacity for the third time interval; and in accordance with a determination that the workload exceeds the processing capacity, causing at least one incoming request for the target function to be routed to the target instance of the target function in the second computing environment.

11. The computer program product of claim 7, wherein the computer code further includes instructions for causing the processor(s) set to perform the following operation(s):

in accordance with a determination that the number of requests pending for processing is decreasing from the first time interval to the second time interval, determining that the target function is to be in a non-rate-limit status in the first computing environment for a fourth time interval; and in accordance with a determination that the target function is to be in the non-rate-limit status for the fourth time interval, causing incoming requests for the target function to be routed to the service in the first computing environment without being routed to the target instance of the target function in the second computing environment.

12. The computer program product of claim 7, wherein the causing comprises:

determining an access destination of the target instance of the target function in the second computing environment; and causing at least one incoming request to be routed to the access destination of the target instance.

13. A computer system comprising:

a processor(s) set;

a set of storage device(s); and computer code stored collectively in the set of storage device(s), with the computer code including data and instructions to cause the processor(s) set to perform at least the following operations:

determining a workload of a target function of a service provisioned in a first computing environment, determining a processing capacity of the service available for the target function in the first computing environment, and in accordance with a determination that the workload exceeds the processing capacity, causing at least one incoming request for the target function to be routed to a target instance of the target function, the target instance of the target function being provisioned in a second computing environment different from the first computing environment, wherein determining the processing capacity comprises:
    determining, based on the information on execution of the requests, a change of the number of requests pending for processing from a first time interval to a second time interval after the first time interval,
    in accordance with a determination that the number of requests pending for processing is increasing from the first time interval to the second time interval, determining that the target function is to be in a rate-limit status in the first computing environment for a third time interval after the second time interval, and
    in accordance with a determination that the target function is to be in the rate-limit status for the third time interval, determining the processing capacity for the third time interval.

14. The computer system of claim 13, wherein the second computing environment comprises a serverless computing environment.

15. The computer system of claim 13, wherein determining the processing capacity comprises:
  determining the processing capacity based on information on execution of requests for the target function in the first computing environment.

16. The computer system of claim 13, wherein the causing comprises:
  in accordance with a determination that the target function is in the rate-limit status for the third time interval, determining whether a workload of the target function within the third time interval exceeds the processing capacity for the third time interval; and
  in accordance with a determination that the workload exceeds the processing capacity, causing at least one incoming request for the target function to be routed to the target instance of the target function in the second computing environment.

17. The computer system of claim 13, wherein the computer code further includes instructions for causing the processor(s) set to perform the following operation(s):
  in accordance with a determination that the number of requests pending for processing is decreasing from the first time interval to the second time interval, determining that the target function is to be in a non-rate-limit status in the first computing environment for a fourth time interval; and
  in accordance with a determination that the target function is to be in the non-rate-limit status for the fourth time interval,
  causing incoming requests for the target function to be routed to the service in the first computing environment without being routed to the target instance of the target function in the second computing environment.

18. The computer system of claim 13, wherein the causing comprises:
  determining an access destination of the target instance of the target function in the second computing environment; and
  causing at least one incoming request to be routed to the access destination of the target instance.

* * * * *